US008827383B2

(12) United States Patent
Simula

(10) Patent No.: US 8,827,383 B2
(45) Date of Patent: Sep. 9, 2014

(54) ELASTOMERIC TIRE FOR A TRACKED VEHICLE

(75) Inventor: Glen Raymond Simula, Hancock, MI (US)

(73) Assignee: GSE Technologies, LLC, Houghton, MI (US)

( * ) Notice: Subject to any disclaimer, the term of this patent is extended or adjusted under 35 U.S.C. 154(b) by 796 days.

(21) Appl. No.: 12/964,214

(22) Filed: Dec. 9, 2010

(65) Prior Publication Data

US 2012/0146394 A1 Jun. 14, 2012

(51) Int. Cl.
B62D 55/14 (2006.01)
B62D 55/096 (2006.01)
B60C 7/10 (2006.01)

(52) U.S. Cl.
CPC ............ B60C 7/102 (2013.04); B62D 55/0966 (2013.01); B62D 55/145 (2013.01)
USPC ........................................ 305/124; 301/5.307

(58) Field of Classification Search
USPC ............... 305/124, 129, 136, 137; 301/5.307, 301/5.308; 152/5, 7, 40, 47, 246
See application file for complete search history.

(56) References Cited

U.S. PATENT DOCUMENTS 2,792,868 A    5/1957  Benson
4,573,510 A *  3/1986  Ippen et al. .................. 152/159
5,768,874 A    6/1998  Bourgois et al.
5,879,484 A *  3/1999  Spragg et al. ................. 152/516
5,906,693 A    5/1999  Morii et al.
6,619,357 B1 * 9/2003  Gillard et al. ................. 152/531
6,681,822 B2 * 1/2004  Adams et al. ...................... 152/7
7,137,675 B1 * 11/2006 Simula et al. ................. 305/194
7,201,242 B2 * 4/2007  Tucker, Jr. ...................... 180/9.3
8,202,381 B2 * 6/2012  Kudo et al. .................... 156/123
2007/0243375 A1 10/2007 Kohashi et al.
2010/0052409 A1 * 3/2010  Ikeda ............................. 301/13.2
2010/0200131 A1 * 8/2010  Iwase et al. ................. 152/209.1
2011/0024008 A1 * 2/2011  Manesh et al. ..................... 152/5
2011/0223366 A1 * 9/2011  Petri et al. ..................... 428/36.5

FOREIGN PATENT DOCUMENTS

FR    2047520   * 12/1971
FR    2696979    * 4/1994

* cited by examiner

Primary Examiner — Dennis H Pedder
Assistant Examiner — Beverly Becker
(74) Attorney, Agent, or Firm — Brooks Kushman P.C.

(57) ABSTRACT

A road wheel for a tracked vehicle is provided with a circular mounting flange having a dished wall extending radially outwards and circumferentially therefrom, a peripheral rim having a first edge and a second edge with the rim connected to an outer edge of the dished wall at an intermediate region of the rim, and a first lip extending from the first edge. Another road wheel for a tracked vehicle is provided with a mounting flange, a peripheral rim, at least one inner dished wall, at least one outer dished wall offset from the inner dished wall along the flange, and at least two connector walls with each connector wall extending between the inner dished wall, outer dished wall, and the peripheral rim.

18 Claims, 7 Drawing Sheets

ELASTOMERIC TIRE FOR A TRACKED VEHICLE

The invention was made in part with Government support. The Government may have certain rights to the invention.

BACKGROUND

1. Technical Field

The invention relates to non-pneumatic tires for use with tracked vehicles.

2. Background Art

Tracked vehicles have applications in military use, heavy commercial use, and others where the vehicle may be travelling over uneven terrain, carrying a heavy load, or the like. The vehicles have a track which interfaces with the ground to support or propel the vehicle. Wheels are located within the track to drive or support it. Some of the wheels are connected to the drivetrain of the vehicle. A tire is placed over the rim of the wheels to interface with the track to improve ride quality characteristics. The tires are typically made from a natural or synthetic rubber and are solid, or non-pneumatic.

Typical failure modes of these rubber tires are blow-out and heat checking from high operating temperatures, cutting and chunking from sharp debris, and bonding failure at the rubber-wheel interface. Failure of the elastomer rubber tire on the road wheel may account for more than ninety-five percent of all road wheel failures. For temperature failures, the primary source of heat generation is hysteretic heating from the rubber, with vehicle speed and ambient temperatures as strong contributors. The higher the operating speed of the vehicle, the greater the number of hysteretic cycles the elastomer goes through, and consequently the higher the operating temperature. The thickness of the elastomer has a major affect on the hysteretic heating. Typically a thicker tire and a lower modulus generate greater hysteretic heating, but provide better damping for reduced vehicle vibrations. As a result the compound is blended for a compromise in these design features.

For cutting and chunking, sharp pointed debris material indents the elastomer. Once the elastomer tensile forces at the tip of the debris exceed the tensile strength of the elastomer, a crack initiates and then begins to propagate. Two usual methods to prevent crack initiation include using a higher modulus elastomer or a thicker tire. Unfortunately, the tensile strength of elastomer decreases drastically with higher operating temperatures over 175 F or 200 F. The higher temperatures promote crack initiation by weakening the tire.

Currently, tire improvements are being sought through use of higher temperature formulations, polyurethane or polyurea, or optimized width and thickness of the rubber.

The cutting and chunking characteristics may be improved with polyurethane, but drawbacks include a lower operating temperature threshold, a harder ride with increased vibrations, additional cost, and greater susceptibility to contaminants and humidity during adhesion molding.

SUMMARY

In one embodiment, a tire assembly for a tracked vehicle has an inner tire layer forming a first tube sized to substantially cover an outer surface of a rim of a wheel, and an outer tire layer forming a second tube with a larger diameter than the first tube, the outer tire layer adapted to contact a track of a vehicle. At least one carcass layer is interposed between the inner and outer tire layers to provide tensile and impact strength to prevent crack propagation from reaching the inner tire layer of the tire assembly, thereby prolonging the useful life of the tire assembly and reducing the frequency of replacement of the tire assembly. The inner and outer tire layers encapsulate the carcass layer to protect it from an environment of use.

In another embodiment a wheel assembly for a tracked vehicle has a wheel with a circular mounting flange with a wall extending radially outwards and circumferentially therefrom, and a peripheral rim connected to an outer edge of the wall. The peripheral rim has an outer surface. The wheel assembly also has a tire with an inner layer sized to substantially cover the outer surface of the peripheral rim, at least one intermediate fabric carcass layer bonded to an outer surface of the inner layer, and an outer layer bonded to an outer surface of the at least one carcass layer. The outer layer is adapted to contact a track of a vehicle. The at least one intermediate carcass layer provides tensile and impact strength to prevent crack propagation from reaching the inner layer of the tire, thereby prolonging the useful life of the tire and reducing the frequency of replacement of the tire.

Yet another embodiment provides a method of forming a tire assembly for a wheel of a tracked vehicle. An inner tire layer is provided as a first tube about a rim of a wheel. The inner tire layer is sized to substantially cover an outer surface of the rim. An outer tire layer is positioned about the inner tire layer as a second tube with a larger diameter than the first tube. The outer tire layer is adapted to contact a track of a vehicle. At least one carcass layer is interposed between the inner and outer tire layers. The carcass layer provides tensile and impact strength to prevent crack propagation from reaching the inner tire layer of the tire assembly, thereby prolonging the useful life of the tire assembly and reducing the frequency of replacement of the tire assembly. The inner and outer tire layers encapsulate the carcass layer to protect it from an environment of use.

DETAILED DESCRIPTION

As required, detailed embodiments of the present invention are disclosed herein; however, it is to be understood that the disclosed embodiments are merely exemplary of the invention that may be embodied in various and alternative forms.

The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
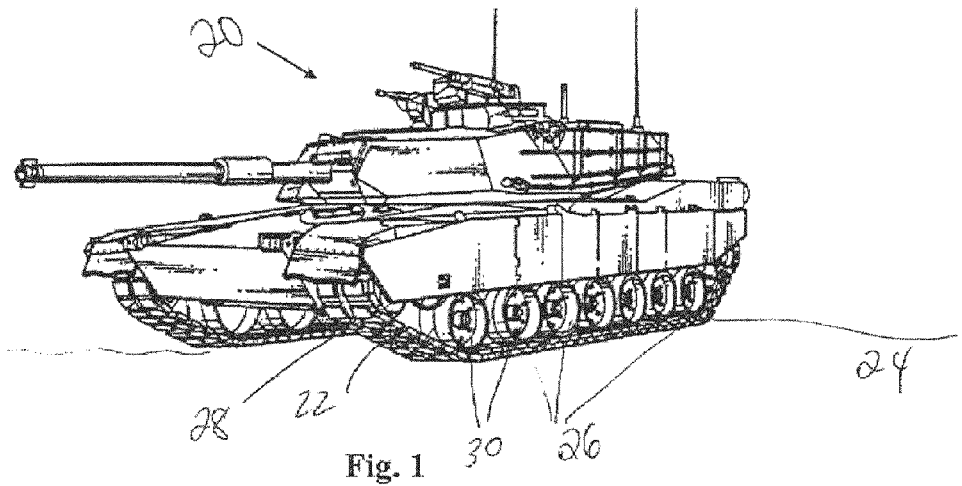
FIG. 1 is a perspective view of an embodiment of a tracked vehicle.

FIG. 1 illustrates a tracked vehicle 20. The tracked vehicle 20 may be an armored tank as shown, and may also be any military, commercial, or other tracked vehicle as is known in the art. The vehicle 20 has a track 22 to interact with an underlying surface 24. The underlying surface may be a road, or uneven terrain such as dirt, rock, or the like. The track 22 is continuous and is supported by wheels 26. The wheels 26 may include drive wheels 28 at the front or rear of the vehicle 20 to transfer power to the track 22, and road wheels 30 to support the vehicle 20 on the track 22.

Figure 2:
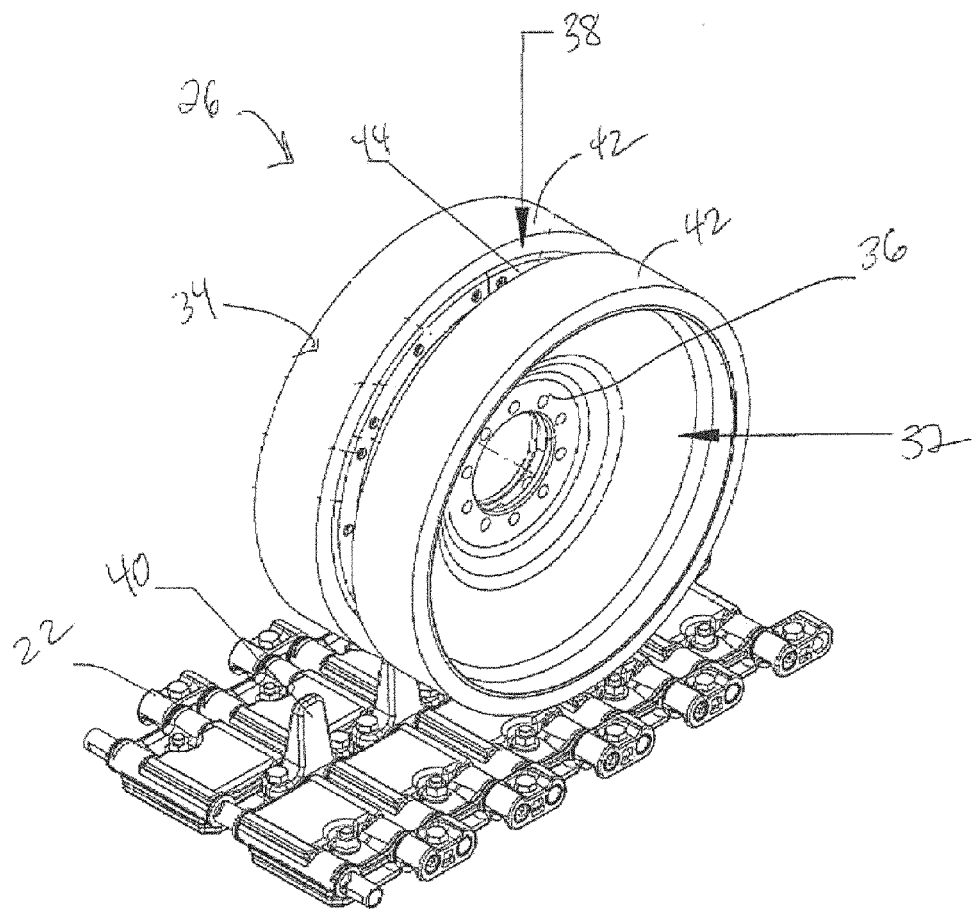
FIG. 2 is a perspective view of a pair of wheels and a section of track of the vehicle of FIG. 1.

FIG. 2 illustrates a pair of wheels 26 interacting with a track section 22 of the tracked vehicle 20. The pair of wheels 26 has a first wheel 32, or outer wheel, and a second wheel 34, or inner wheel, connected to one another along the mounting flange 36 of each wheel 26. A gap 38 is formed between the wheels 32, 34, which interacts with a guide 40 on the track 22 to retain and align the pair of wheels 26 with the track 22. The interface between the guide 40 and one of the wheels 32, 34 transmits a lateral vehicle load to the track 22 during side slope operations and vehicle cornering, and maintains track alignment. Each wheel 26 also has a wear ring 44 on the inner surface of each wheel 26 adjacent to the gap 38. The wear rings 44 interface with the guide 40 and protect the surface of the wheels 26, which may extend the lifetime of the wheels 26.

Each wheel 32, 34 has a tire 42, or an elastomeric pad, located circumferentially around each wheel 32, 34. The tires 42 act as an interface between the wheels 32, 34 and the track 22.

Figure 3:
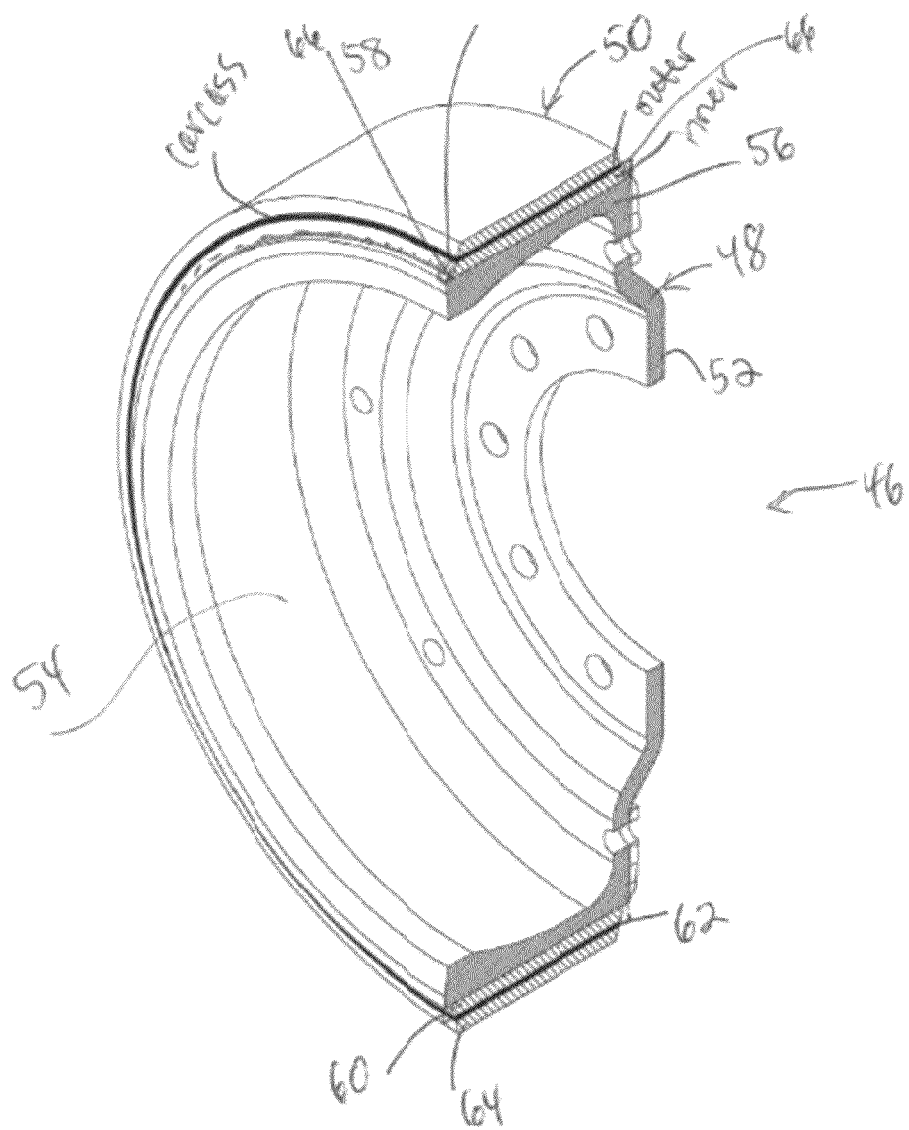
FIG. 3 is a perspective section view of a tire and wheel according to another embodiment.
Figure 4:
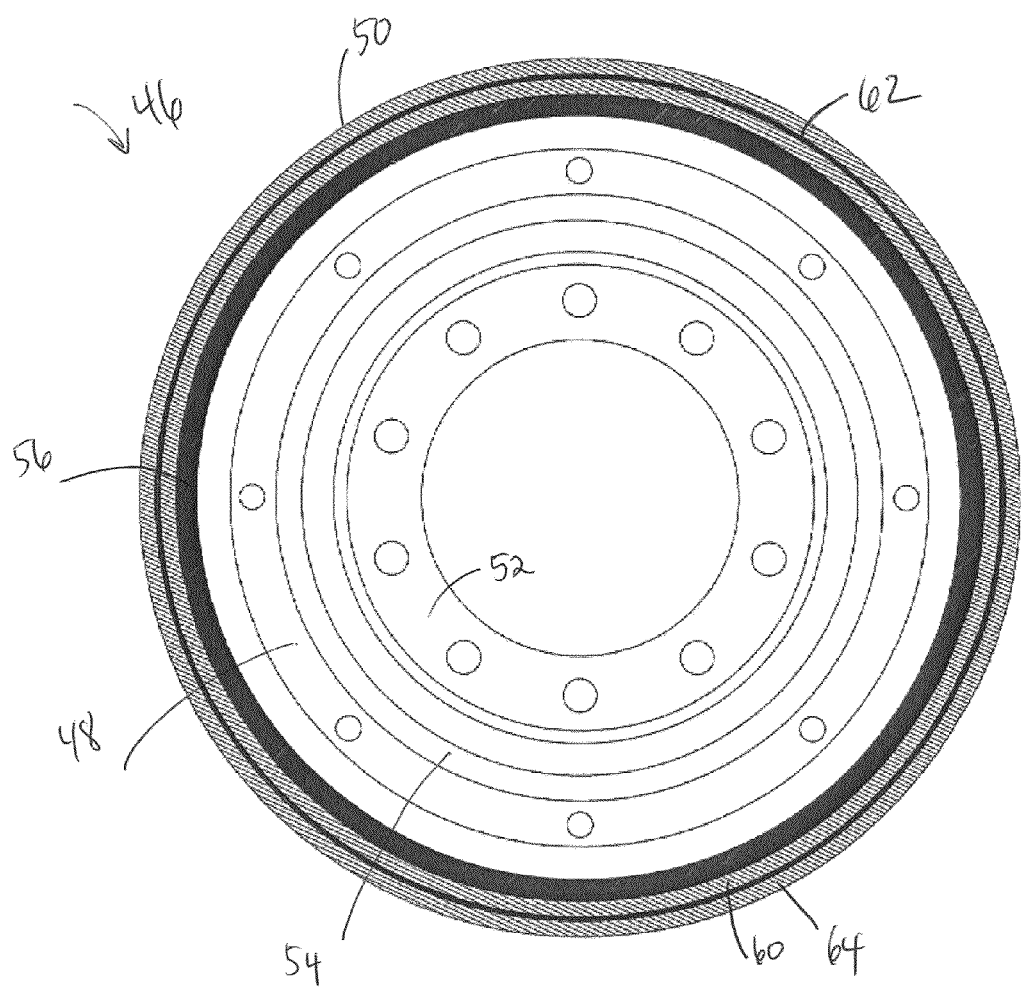
FIG. 4 is a top section view of the tire and wheel of FIG. 3.
Figure 5:
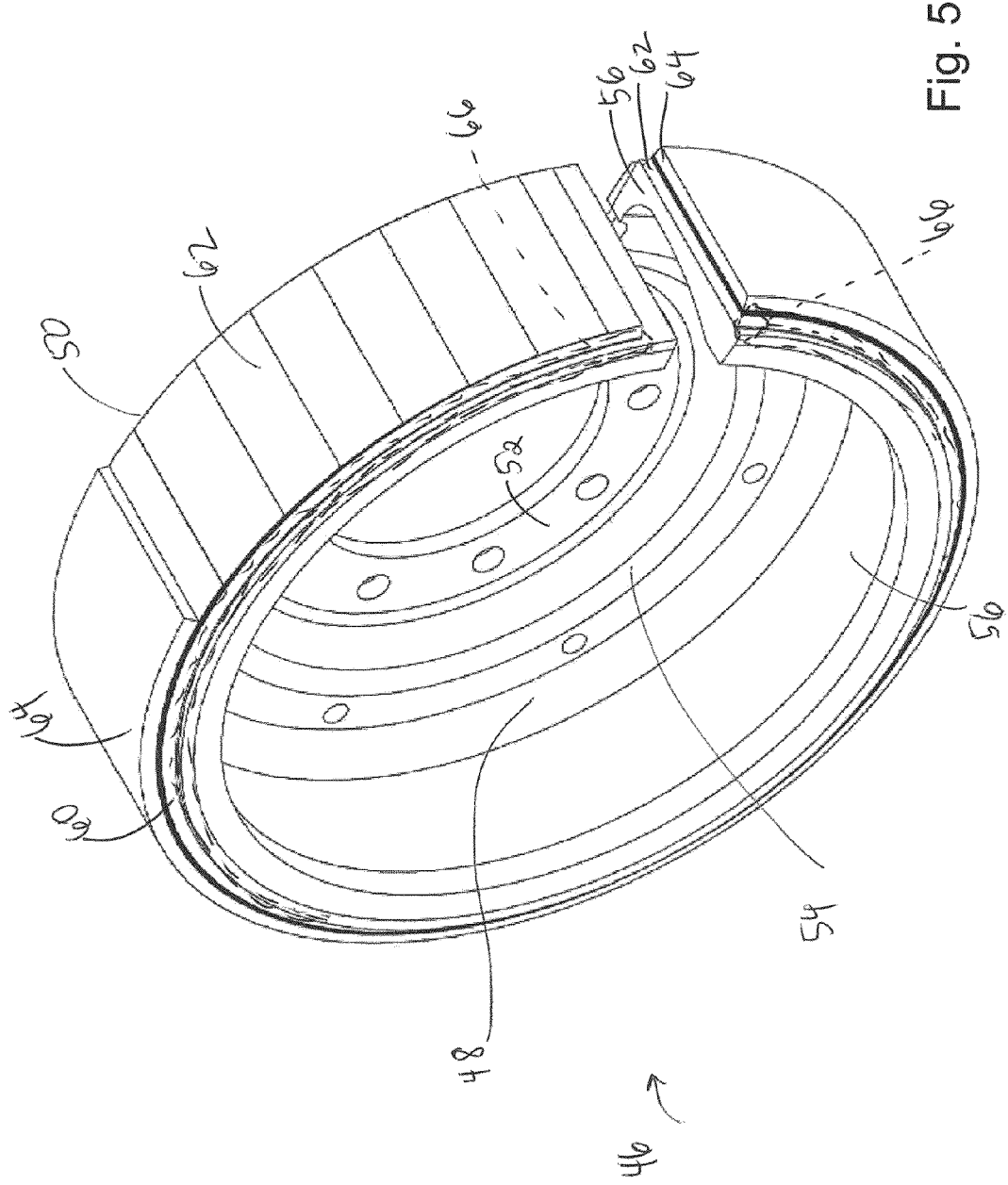
FIG. 5 is a perspective section view of the tire and wheel of FIG. 3.

FIGS. 3-5 illustrate an embodiment of a wheel assembly 46 with a wheel 48 and a tire 50. The wheel 48 has a circular mounting flange 52 which allows for attachment to an adjacent wheel to form a pair of wheels to interact with a track. A wall 54 extends from the mounting flange 52 radially outwards and circumferentially. A rim 56 is connected to the outer edge of the wall 54. The rim 56 has an outer surface 58. The wheel 48 may be fabricated from steel, aluminum, magnesium, alloys, and other metals or materials as is known in the art. The wheel 48 may be forged or cast. Other shapes and cross sections for the wheel 48 are also contemplated as are known in the art.

Figure 6:
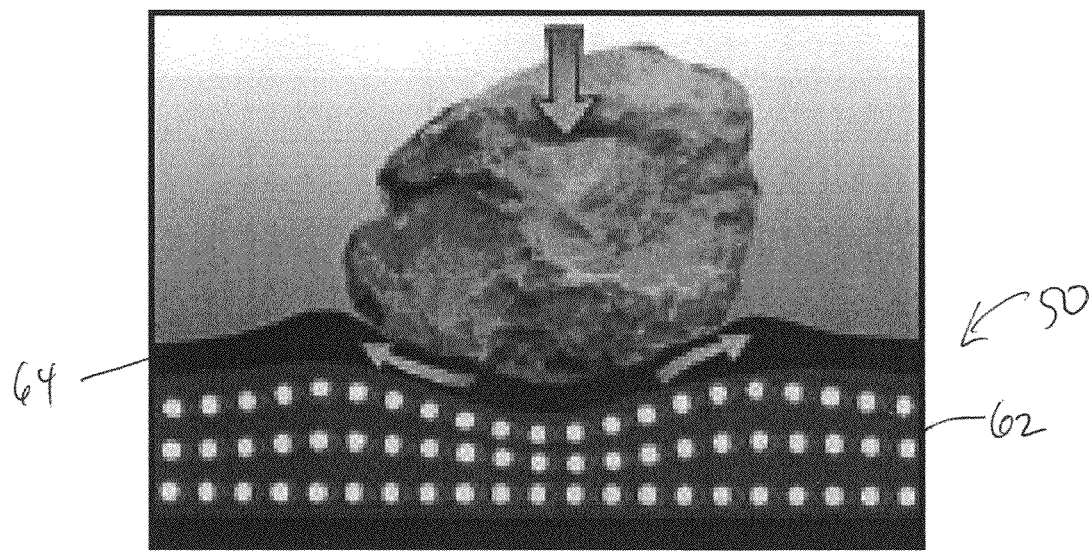
FIG. 6 is a partial section view of a tire according to yet another embodiment.

A tire 50 is positioned around the outer surface 58 or the rim 56 or the wheel 48. The tire 50 may be a non-pneumatic structure that substantially covers the outer surface 58 of the rim 56. The use of the phrase "non-pneumatic" with respect to the tire 50 does not preclude having air or another gas or fluid within the tire 50 structure. For example, an air bladder, a honeycomb layer containing a gas, or the like are contemplated for the tire 50. The tire 50 has an inner layer 60 positioned adjacent to the rim 56. An intermediate layer 62 is positioned on the outer surface of the inner layer 60. An outer layer 64 is positioned on the outer surface of the intermediate layer 62 and designed to be in contact with the track of the vehicle. The inner and outer layers 60, 64 are made from natural rubber, synthetic rubber, or another material with similar properties. In one embodiment, the inner tire layer 60 has a stiffer compliance than the outer tire layer 64. The intermediate layer 62 has at least one fabric carcass layer. The carcass layer 62 provides tensile and impact strength to the tire 50 and prevents crack propagation through the tire 50, as shown in FIG. 6. The carcass layer 62 also has natural abrasion and tear resistance which is beneficial as the tire 50 wears. By preventing crack propagation from the outer layer 64 through the tire 50, a crack cannot reach the inner layer 60 of the tire 50, the useful life of the tire 50 is prolonged, and the frequency of replacement of the tire 50 is reduced. The inner and outer layers 60, 64 may encapsulate the carcass layer 62 to protect it from the environment of use when the vehicle is in the field.

Figure 7:
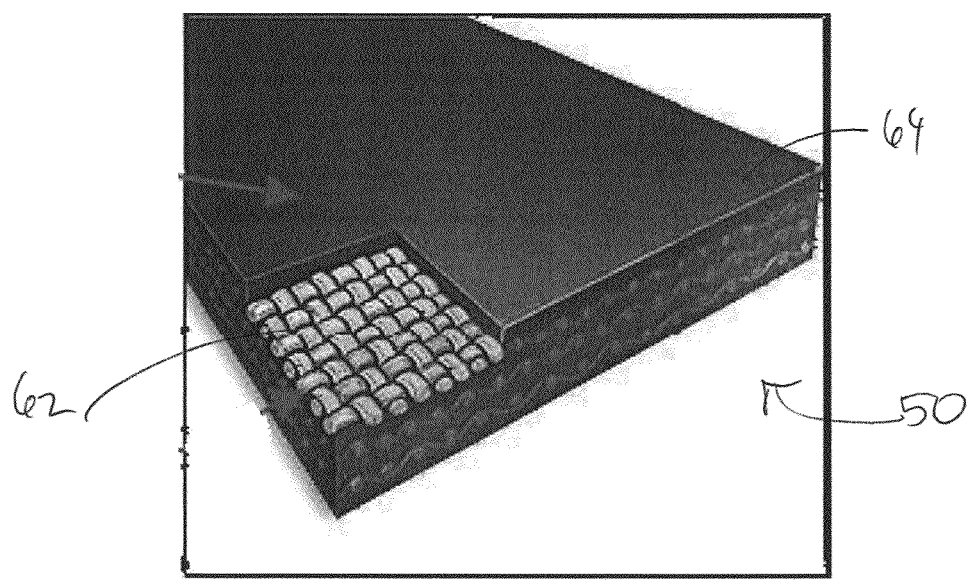
FIG. 7 is a schematic view of a tire and debris according to another embodiment.

Referring back to FIGS. 3-5, the fabric carcass layer 62 may be made from polyester, nylon, steel, aramid, para-aramid, or other fibers as are known in the art. The fabric in the carcass layer 62 may be single ply or multiple ply. In one embodiment, the fabric in the carcass layer 62 is unidirectional and may be aligned with the direction of rotation of the wheel 46, orthogonal to the direction of rotation of the wheel 46, or positioned otherwise. In another embodiment, the fabric in the carcass layer 62 has a weave pattern with a first set of fibers in the weave positioned in a first fiber direction and a second set of fibers in the weave positioned in a second fiber direction. The first set of fibers may be made from the same material or a different material as the second set of fibers. The first fiber direction may be orthogonal to the second fiber direction, or alternatively, may be arranged at any angle relative to the other. For example, as shown in FIG. 7, the first fiber direction is generally aligned with a rotational direction of the wheel with the second fiber direction generally orthogonal to the first fiber direction. Alternatively, the first fiber direction is offset from a rotational direction of the wheel with the second fiber direction generally orthogonal to the first fiber direction.

Referring back to FIGS. 3-5, the inner layer 60, intermediate layer 62, and the outer layer 64 may be bonded together during the manufacturing process for the tire 50 by using an adhesive or through another process as is known in the art.

In one embodiment the tire 50 is bonded to the wheel 48 using an adhesive. In another embodiment, the tire 50 is undersized relative to the rim 56 of the wheel 48, which retains the tire 50. Alternatively, one or two axial rings 66 (in phantom) are positioned on the outer surface 58 of the rim 56 and on either side of the tire 50 to mechanically retain the tire 50 on the wheel 48. In another embodiment, the outer surface 58 of the rim 56 is machined to have a specified roughness or a machined pattern to mechanically retain the tire 50 on the wheel 48.

Figure 8:
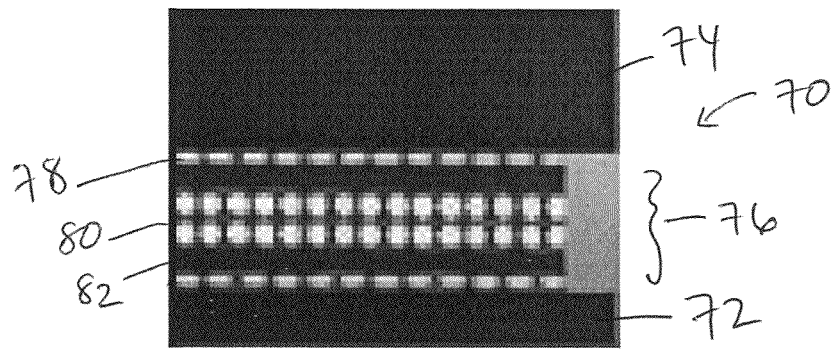
FIG. 8 is a section schematic view of a tire according to yet another embodiment.

FIG. 8 illustrates another embodiment of a tire 70 for use with a wheel 26. The tire has an inner layer 72 and an outer layer 74. The inner and outer layers may be different thicknesses to provide varying damping and wear characteristics. The intermediate layer 76 has multiple fabric carcass layers. The intermediate layer as shown has a pair of outer fabric layers 78, a central fabric layer 80, and additional elastomer layers 82 separating them. The elastomer layer 82 may be a natural or synthetic rubber or a polymer material. The pair of outer fabric layers 78 and the central fabric layer may contain the same or different weave patterns or fiber material.

Figure 9:
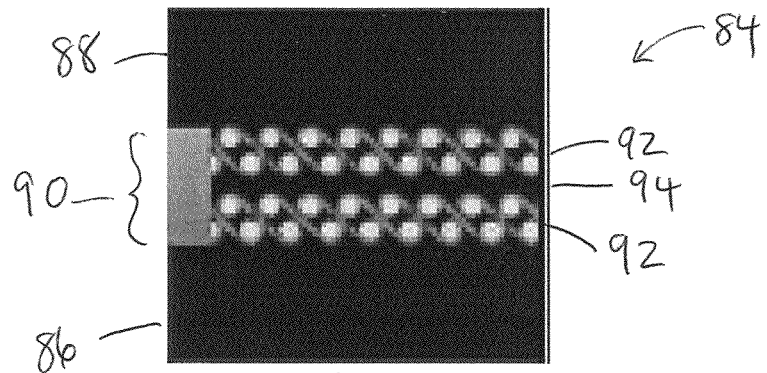
FIG. 9 is a section schematic view of a tire according to another embodiment.

FIG. 9 illustrates an embodiment of a tire 84 for use with a wheel 26. The tire has an inner layer 86 and an outer layer 88. The intermediate layer 90 has multiple fabric carcass layers. The intermediate layer 90 as shown has a pair of fabric layers 92 and an additional elastomer layer 94 separating them. The elastomer layer 94 may be a natural or synthetic rubber or a polymer material. The pair of fabric layers 92 may contain the same or different weave patterns or fiber material.

Figure 10:
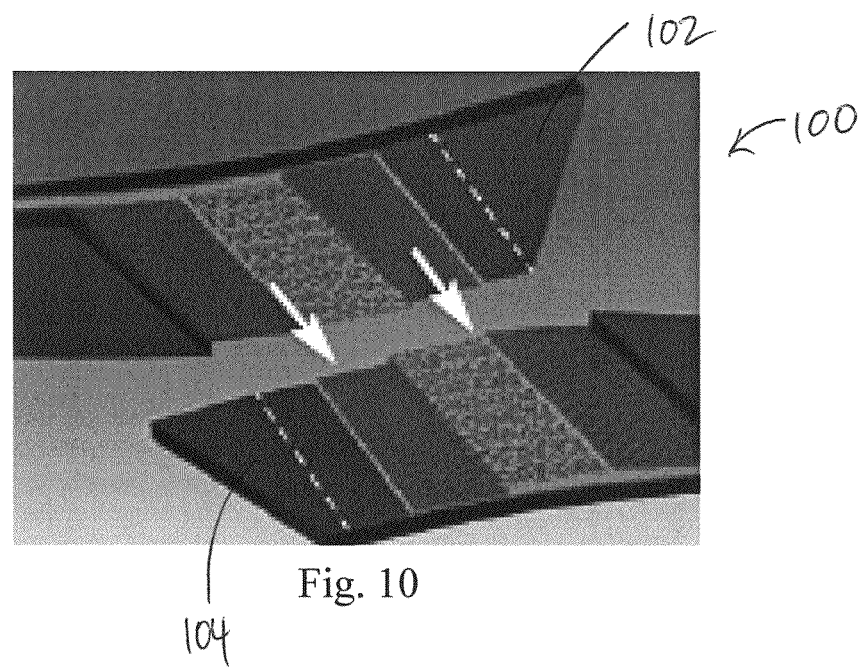
FIG. 10 is a partial view of a tire assembly according to an embodiment.

Referring back to FIG. 2, the tire 42 may be manufactured in several ways including: a molded continuous loop belt or splicing a belt that is prepared to length. A tire 100 with a spliced belt connection is shown in FIG. 10. For a spliced belt tire 100, a vulcanized step splice may be used with a series of steps prepared on the two tire ends 102, 104. These ends 102, 104 overlap the functional layers within the tire 100. The splice then undergoes a vulcanizing process for curing. When prepared properly, a vulcanized step splice can have similar load and bend ratings as the continuous portion of the tire 100.

Figure 11:
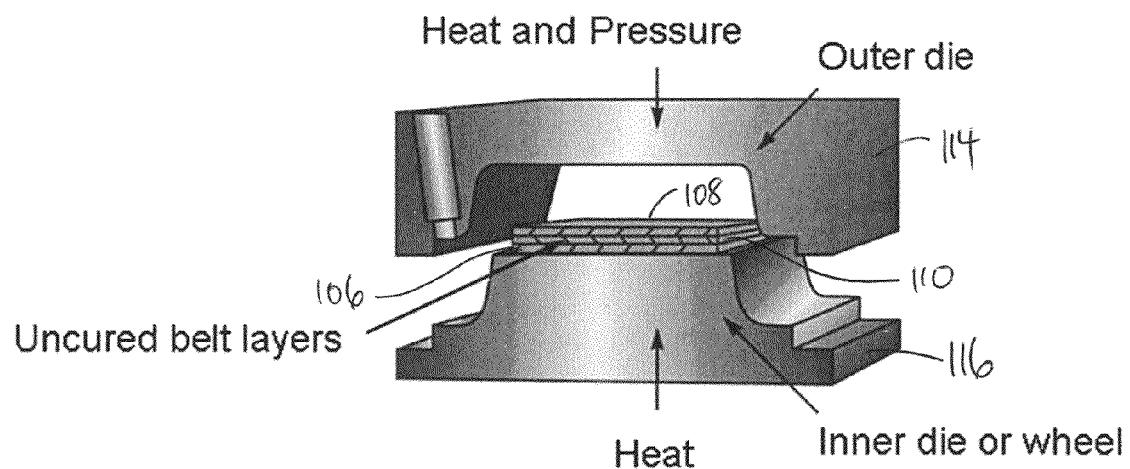
FIG. 11 is a schematic view of a tire assembly according to another embodiment.

The spliced belt tire may be attached to the wheel 32 using compression molding as shown in FIG. 11. The tire 100 has an inner layer 106 and an outer layer 108 which may be made from an uncured rubber. The intermediate layer 110 includes a fabric carcass layer. The layers of the tire 100 are placed within the compression mold 112. The outer piece 114 of the compression mold 112 is an outer die. The inner piece 116 of the compression mold 112 is either an inner die to fabricate a tire 100 alone, or the wheel 32 for direct compression molding of the tire 100 to the wheel 32. The outer piece 114 compresses the tire 100 against the inner piece 116 and heats it to form and cure the circular tire 100. Final curing of the tire in the compression mold 112 may also eliminate the joint as a potential weak spot. Compression molding the tire 100 directly onto the wheel 26 provides a strong bond between the inner layer 106 the rim of the wheel 32.

Referring back to FIG. 3, in other embodiments, the tire 50 may be attached and retained to the wheel 46 using a tensile force in the tire 50 to maintain a friction fit between the tire 50 and the wheel 46 or a structural adhesive may be used to bond the tire 50 to the wheel 46. In addition to the friction fit or the use of adhesive, the tire 50 may be mechanically retained on the wheel 46, and not molded directly to the wheel 46. This allows for replacement of the tire 50 in the field instead of returning them for reconditioning. An axial ring 66, or retention ring, retains and supports the tire 50 on one or both ends of the rim 56 to prevent the tire 50 from "walking off" the rim 56. In this configuration, the one of the two rings 66 is fixed while the other one of the rings 66 may be removed for assembly and disassembly of the tire 50.

The use of an adhesive bond or a friction fit with the tire 50 allows a tire 50 to be replaced in the field without the need for a remote refurbishment process to replace the tire 50.

Figure 12:
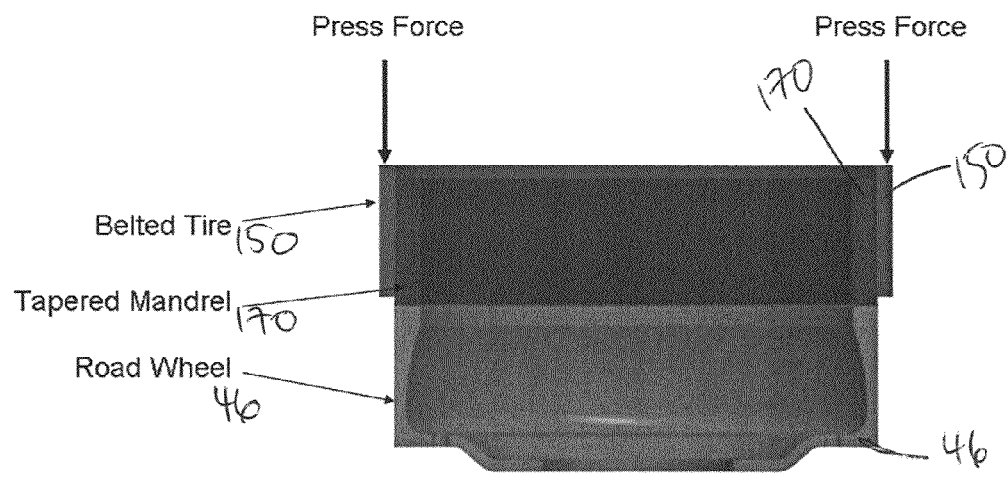
FIG. 12 is a schematic view of a tire assembly according to yet another embodiment.

For a friction fit tire 50, the tire 50 is undersized relative to the wheel 46 circumference. When the tire 50 is pressed over the wheel 46 a tensile force is developed in the tire 50, which creates a static contact pressure between the wheel 46 and tire 50. Depending on the initial preload based on the tire 50 sizing, the contact pressure can be relatively high, creating a significant friction force to resist tire slippage and shear off of the wheel 46. In one embodiment, the tire pretension is combined with an adhesive for a stronger bond. One method of assembling the tire 150 to the wheel 46 is depicted in FIG. 12, showing a press operation. The tire 150 is placed over a mandrel 170, which is adjacent to the wheel 46. A force is applied to the tire 150 causing it to slide on the mandrel 170 and onto the wheel 46. Disassembly of the tire 150 from the wheel 46 may include cutting the tire 150 and peeling it from the wheel 46. The wheel 46 rim may need to be cleaned if an adhesive is used before assembling a replacement tire 150 to the wheel 46.

The wheel 46 may additionally have a surface finish applied to the outer surface 58 of the rim 56, which may include scoring, blasting, machined grooves or ridges, or alternate wheel rim 56 geometry such as a convex or a concave profile to aid in retention of the tire 50.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. Additionally, features of various implementing embodiments may be combined to form further embodiments of the invention.

What is claimed:

1. A tire assembly for a tracked vehicle comprising:
    an inner tire layer forming a first tube sized to substantially cover and contact an outer surface of a rim of a wheel;
    an outer tire layer forming a second tube having a treadless outer surface adapted to contact a track of a vehicle;
    at least one carcass layer interposed between and in contact with the inner and outer tire layers, the at least one carcass layer comprising first and second outer fabric layers and a central fabric layer interposed therebetween, the carcass layer providing tensile and impact strength to prevent crack propagation from reaching the inner tire layer of the tire assembly thereby prolonging the useful life of the tire assembly and reducing the frequency of replacement of the tire assembly;
    a first elastomer layer separating the first fabric layer and the central fabric layer; and
    a second elastomer layer separating the second fabric layer and the central fabric layer;
    wherein the inner and outer tire layers encapsulate the carcass layer to protect it from an environment of use.

2. The tire assembly of claim 1 wherein the at least one carcass layer is constructed from a fabric.

3. The tire assembly of claim 2 wherein a fiber in the fabric includes at least one of polyester, nylon, steel, aramid, and para-aramid.

4. The tire assembly of claim 2 wherein the fabric is single ply.

5. The tire assembly of claim 2 wherein the fabric is multiple ply.

6. The tire assembly of claim 1 wherein the at least one carcass layer has a weave having a first fiber direction and a second fiber direction generally orthogonal to the first fiber direction.

7. The tire assembly of claim 6 wherein the first fiber direction is generally aligned with a rotational direction of the wheel.

8. The tire assembly of claim 6 wherein the first fiber direction is offset from a rotational direction of the wheel.

9. The tire assembly of claim 1 wherein the inner tire layer has a stiffer compliance than the outer tire layer.

10. The tire assembly of claim 1 wherein the outer tire layer includes one of a natural rubber and a synthetic rubber; and
    wherein the inner tire layer includes one of a natural rubber and a synthetic rubber.

11. A wheel assembly for a tracked vehicle comprising:
    a wheel having a circular mounting flange with a wall extending radially outwards and circumferentially therefrom, and a peripheral rim connected to an outer edge of the wall, the peripheral rim having an outer surface; and
    a tire having:
        an inner layer forming a first tube sized to substantially cover and contact the outer surface of the peripheral rim,
        at least one intermediate fabric carcass layer bonded to an outer surface of the inner layer, the at least one carcass layer comprising first and second outer fabric layers and a central fabric layer interposed therebetween, a first elastomer layer separating the first fabric layer and the central fabric layer, and a second elastomer layer separating the second fabric layer and the central fabric layer, and an outer layer forming a second tube and bonded to an outer surface of the at least one carcass layer, the outer layer having a smooth, treadless, outer surface adapted to contact a track of a vehicle;

wherein the at least one intermediate carcass layer provides tensile and impact strength to prevent crack propagation from reaching the inner layer of the tire thereby prolonging the useful life of the tire and reducing the frequency of replacement of the tire; and wherein the inner and outer tire layers encapsulate the carcass layer to protect it from an environment of use.

12. A method of forming a tire assembly for a wheel of a tracked vehicle comprising:

providing an inner tire layer as a first tube about a rim of a wheel, the inner tire layer sized to substantially cover and contact an outer surface of the rim;

positioning an outer tire layer about the inner tire layer as a second tube with a larger diameter than the first tube, the outer tire layer having a smooth, treadless, outer surface adapted to contact a track of a vehicle;

interposing at least one carcass layer between the inner and outer tire layers and in contact with the inner and outer tire layers, the at least one carcass layer providing tensile and impact strength to prevent crack propagation from reaching the inner tire layer of the tire assembly thereby prolonging the useful life of the tire assembly and reducing the frequency of replacement of the tire assembly, the at least one carcass layer comprising first and second outer fabric layers and a central fabric layer interposed therebetween; and separating the first fabric layer and the central fabric layer with a first elastomer layer, and separating the second fabric layer and the central fabric layer with a second elastomer layer;

wherein the inner and outer tire layers encapsulate the carcass layer to protect it from an environment of use.

13. The tire assembly of claim 1 wherein the inner tire layer is solid and the outer tire layer is solid.

14. The tire assembly of claim 1 wherein a radial thickness of the outer tire layer is greater than a radial thickness of the inner tire layer.

15. The tire assembly of claim 1 wherein a radial thickness of the outer tire layer is substantially equal to a radial thickness of the inner tire layer.

16. The wheel assembly of claim 11 further comprising a wear ring positioned adjacent to an outer edge of the wall and adapted to interface with a guide of the tracked vehicle.

17. The wheel assembly of claim 11 wherein the wheel is a first wheel and the tire is a first tire, the wheel assembly further comprising:

a second wheel having a circular mounting flange with a wall extending radially outwards and circumferentially therefrom, and a peripheral rim connected to an outer edge of the wall, the peripheral rim having an outer surface; and a second tire having:

an inner layer sized to substantially cover and contact the outer surface of the peripheral rim, at least one intermediate fabric carcass layer bonded to an outer surface of the inner layer, the at least one intermediate fabric layer adapted to provide tensile and impact strength to prevent crack propagation from reaching the inner layer of the tire thereby prolonging the useful life of the tire and reducing the frequency of replacement of the tire, and an outer layer bonded to an outer surface of the at least one carcass layer, the outer layer having a smooth, treadless, outer surface adapted to contact a track of a vehicle;

wherein the mounting flange of the first wheel is connected to the mounting flange of the second wheel thereby forming a gap therebetween to interact with a guide on the track of the vehicle.

18. The wheel assembly of claim 11 wherein the inner tire layer is solid and the outer tire layer is solid; and wherein a radial thickness of the outer layer is greater than a radial thickness of the inner layer.

* * * * *